Feb. 18, 1941.  A. H. SNYDER  2,232,279

VENT PLUG FOR AIRCRAFT BATTERIES

Filed March 16, 1938

Inventor
Almond H. Snyder
By Thyker & Thyker
Attorneys

Patented Feb. 18, 1941

2,232,279

UNITED STATES PATENT OFFICE 2,232,279

VENT PLUG FOR AIRCRAFT BATTERIES

Almond H. Snyder, Lancaster, N. Y., assignor to National Battery Company, St. Paul, Minn., a corporation of Delaware Application March 16, 1938, Serial No. 196,215

2 Claims. (Cl. 251—147)

This invention relates to vent plugs for use in storage batteries and other liquid containers which may be inverted or tilted to such a degree that the liquid contents would spill in the absence of a valve for closing the vent opening automatically when tilted from the normal upright position.

It is an object of this invention to efficiently guard against losses of the liquid contents of the container to be vented by providing a vent plug of this class which is unusually reliable and positive in its action.

A particular object is to provide a valve for closing such a vent passage and novel mechanism for operating the valve to and from closed position.

A further object is to provide a vent plug of this class having a novel arrangement of compression chamber below the valve whereby gas pressure is created in the valve chamber which presses the valve to closed position when the battery or container is inverted or tilted through a predetermined angle of departure from its normal or upright position.

A still further object is to provide an improved and novel arrangement of valve guides and resilient means for closing the valve in a vent plug of this class.

The invention will be best understood by reference to the accompanying drawing in which.

Figure 2:
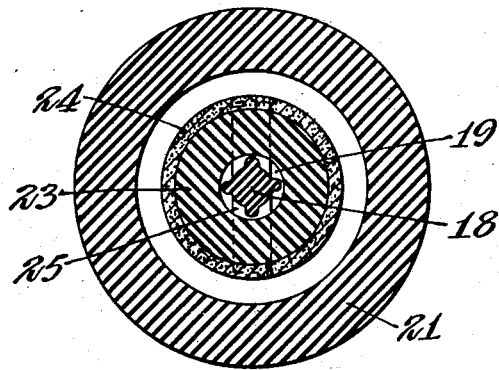
Fig. 2 is a horizontal section taken on the line 2—2 of Fig. 1.

My device has a hollow, substantially cylindrical casing member 5 which is closed at its normally upper end by a head 6, secured in place by a cross pin 7 and formed with the restricted outlet passage 8 for gases. This passage communicates with an upper chamber 9 containing a movable weight 10 preferably of spherical form. A partition 11 is threaded in the member 5 at the normally lower extremity of the chamber 9 and is formed with a central passage 12 connecting the chamber 9 with a valve chamber 13. The upper surface of the partition 11 is formed with a slotted or vented seat for the weight 10 and around the lower extremity of the passage 12 an annular lip 14 affords a seat for a soft rubber gasket 15 mounted on the upper face of a valve head 16. Integral with this head and projecting upwardly therefrom to be engaged by the weight 10 is a stud 17. This stud fits loosely in the passage 12 to allow the escape of gases upwardly through said passage. A valve guide stem 18 is also integral with the head 16 and projects downwardly therefrom through a passage 19 formed centrally in the lower portion of the member 5. As best shown in Fig. 2, the stem 18 is fluted longitudinally to permit the free circulation of gases past the stem through the passage 19.

A threaded neck 20 is formed on the member 5 to fit within a tubular extension 21 which affords a gas compression, trap chamber 22 below the valve 16. An annular flange 23 on the lower extremity of the member 5 is embraced by an elastic collar 24, said flange being provided with an annular groove to retain the collar. Integral with the collar 24 is a thin, elastic band 25 which extends across the lower end of the stem 18 for actuating the valve 16 to closed position. The band 25 is confined between lugs 26 on the lower extremity of the stem 18 and is under sufficient tension to raise the valve 16 to closed position when the weight 10 is displaced, as indicated in dotted lines in Fig. 1, by the tilting of the supporting structure. The chamber 22 communicates with the interior of the battery, or other container to be vented, through a slot 27 formed in the lower end of the extension 21. The latter is also formed with a threaded neck 28 adapted to fit a similarly threaded opening in the top of the container to be vented. The neck 20 of the casing member 5 is preferably of the same diameter as the neck 28, and is similarly threaded so that in cases where limitations of space do not permit the use of the extension 20, or where it is unnecessary to use it, the extension 21 may be omitted and the neck 20 turned directly into the container opening. Suitable gaskets 29 are employed to seal the joints at the upper extremities of the threaded necks 20 and 28.

Figure 3:
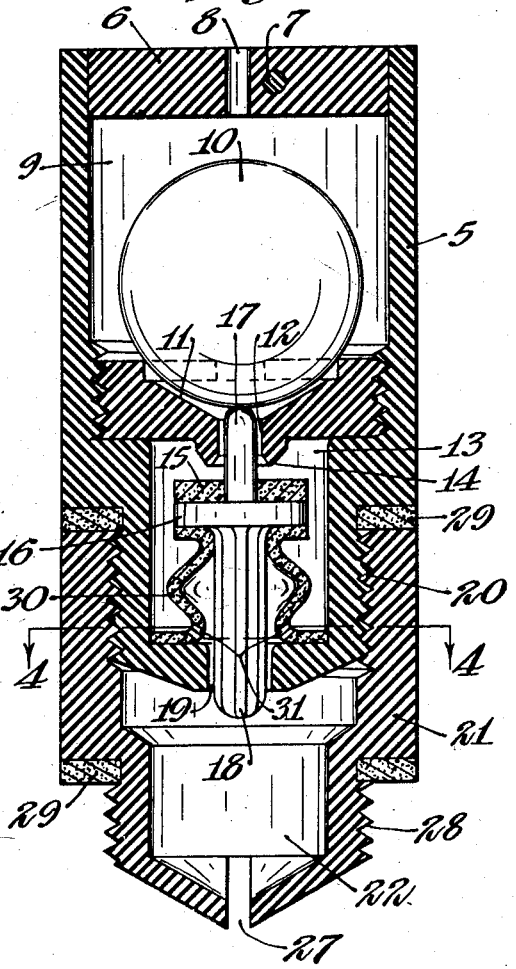
Fig. 3 is a central vertical section through an alternate form of the device.
Figure 4:
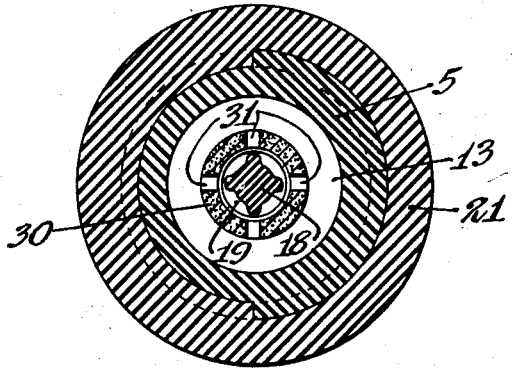
Fig. 4 is a horizontal section taken on the line 4—4 of Fig. 3.

In the alternate form of the device shown in Figs. 3 and 4, the flange 23 and elastic collar 24 and band 25 are omitted and the valve is resiliently urged toward closed position by a tubular spring 30. This spring is constructed from a tube of soft, resilient rubber having outwardly flanged upper and lower extremities engaging respectively the lower surface of the valve head 16 and upper surface of an annular shoulder formed in the bottom of the casing member 5. A series of perforations 31 are formed in the spring 30 to allow flow of gas between the passage 19 and valve chamber 13.

It will be evident that a spring constructed from metal which is resistant to the acid or other electrolyte in the battery may be substituted for the tubular spring 30. For example, a coiled spring constructed from tantalum may be used in the vent plug for batteries containing sulphuric acid as the electrolyte.

Operation

Figure 1:
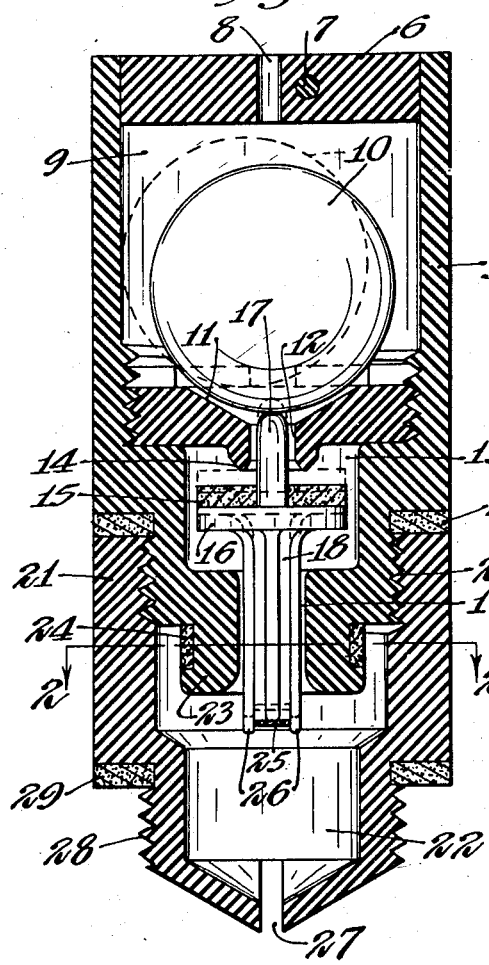
Figure 1 is a central vertical section through one form of my improved vent plug.

In use, when my improved vent plug is tilted through a predetermined angle of departure from the normal vertical position, the weight 10 is displaced, as indicated in dotted lines in Fig. 1, and allows the stud 17 to be thrust upward while the gasket 15 is pressed against the annular lip 14 to close the valve under the action of the elastic band 25 (Figs. 1 and 2). In the case of the alternate construction shown in Figs. 3 and 4 the valve is actuated to closed position by the tubular spring 30. Thus the tilting of either form of plug causes the vent passage to be sealed and prevents the escape of the electrolyte and gases from the battery. When the battery is returned to its normal, substantially upright position the weight 10 rolls into the recess concentric with the passage 12 and forces the valve open by pressing the stud 17 downward against the action of the valve closing spring or elastic band. With the valve in its normal position the battery is vented through the slot 27, chamber 22, passage 19, chamber 13, passage 12, chamber 9 and passage 8. The form of the invention having the elastic band 25 has the advantage over other forms of valve closing springs known to me in that its tension may be controlled accurately and easily and it is unusually simple, inexpensive and reliable in operation.

The extension 21 affords a gas compression chamber 22 which becomes operative when the battery is tilted to trap air and gas which excludes the electrolyte from the valve chamber and assists in holding the valve firmly against its seat. It will be understood that with the valve closed, as soon as the electrolyte closes the slotted opening 27 into the plug casing, the air and other gases in the chamber 22 become trapped and are compressed by the tendency of electrolyte to flow in through the slot 27. This chamber 22 also functions to condense the electrolyte entrained in the escaping gases so that this increment of electrolyte is not lost through the vent plug, but is returned in liquid form to the battery.

Where limitations of space are such that it is impractical or undesirable to use the extension 21, the threaded neck 20 may be engaged directly in the vent plug opening in the battery or other container to be vented.

Having described my invention, what I claim as new and desire to protect by Letters Patent is:

1. A vent plug comprising, a casing having a partition dividing it into upper and lower chambers, a valve passage through said partition, inlet and outlet passages communicating with said lower and upper chambers respectively, a valve movable in said lower chamber to close said passage between chambers, said valve having a head, a compressible sealing member adapted to coact with said head in closing said valve passage, an elastic rubber spring engaging said casing and normally tending to close said valve upwardly, a weight movable in said upper chamber for opening the valve, means projecting upwardly from said valve through said valve passage to be actuated by said weight to open the valve and a guide stem projecting down from said valve and slidable in an opening in the lower end of said casing to direct said valve to and from its seat.

2. In a vent plug, a casing member having a partition forming upper and lower chambers, a valve passage connecting said chambers, inlet and outlet passages communicating with said lower and upper chambers respectively, a valve movable in said lower chamber to close said passage between chambers, a weight movable in said upper chamber for opening the valve, a member projecting from said valve to be actuated by said weight to open the valve, a guide stem projecting down from said valve and slidable vertically in said casing, an annuuar, elastic collar encircling the lower end of said casing member and a thin, elastic spring integral with said collar and engaging the lower end of said stem to actuate said valve toward closed position.

ALMOND H. SNYDER.